US010998626B2

(12) United States Patent
Chigusa et al.

(10) Patent No.: US 10,998,626 B2
(45) Date of Patent: May 4, 2021

(54) ANTENNA CONTROL DEVICE, HEAD-MOUNTED DISPLAY, ANTENNA CONTROL METHOD, AND PROGRAM

(71) Applicant: Sony Interactive Entertainment Inc., Tokyo (JP)

(72) Inventors: Issei Chigusa, Tokyo (JP); Katsuyoshi Onishi, Tokyo (JP); Kazuo Miura, Kanagawa (JP)

(73) Assignee: Sony Interactive Entertainment Inc., Tokyo (JP)

( * ) Notice: Subject to any disclaimer, the term of this patent is extended or adjusted under 35 U.S.C. 154(b) by 226 days.

(21) Appl. No.: 15/770,417

(22) PCT Filed: Nov. 15, 2016

(86) PCT No.: PCT/JP2016/083758
§ 371 (c)(1),
(2) Date: Apr. 23, 2018

(87) PCT Pub. No.: WO2017/086290
PCT Pub. Date: May 26, 2017

(65) Prior Publication Data
US 2018/0323508 A1 Nov. 8, 2018

(30) Foreign Application Priority Data
Nov. 19, 2015 (JP) .............................. JP2015-226420

(51) Int. Cl.
*H01Q 3/02* (2006.01)
*H01Q 3/24* (2006.01)
(Continued)

(52) U.S. Cl.
CPC .............. *H01Q 3/247* (2013.01); *H01Q 3/24* (2013.01); *G02B 27/0176* (2013.01); *H01Q 1/22* (2013.01);
(Continued)

(58) Field of Classification Search
CPC ...... H01Q 3/247; H01Q 3/274; H01Q 1/2258; G02B 27/0176; G02B 27/017;
(Continued)

(56) References Cited

U.S. PATENT DOCUMENTS 8,482,527 B1   7/2013 Kim
8,823,219 B2 * 9/2014 Farahani ................. H01Q 7/00
                                                              307/154
(Continued)

FOREIGN PATENT DOCUMENTS

CN   104641318 A   5/2015
JP   11008893 A    1/1999
(Continued)

OTHER PUBLICATIONS

International Search Report for corresponding PCT Application No. PCT/JP2016/083758, 2 pages, dated Feb. 7, 2017.
(Continued)

*Primary Examiner* — Chuong P Nguyen
(74) *Attorney, Agent, or Firm* — Matthew B. Dernier, Esq.

(57) ABSTRACT

There are provided an antenna control apparatus, a head-mounted display, an antenna control method, and a program that are capable of suppressing power consumption of the head-mounted display including a plurality of antennas. A selection unit selects, as an antenna to be driven, a portion of the plurality of antennas in accordance with an attitude of the head-mounted display including the plurality of antennas. An antenna control unit controls only the antenna to be driven to be driven and an antenna other than the antenna to be driven to be stopped.

7 Claims, 11 Drawing Sheets

(51) Int. Cl.
  *H04N 5/64* (2006.01)
  *H01Q 1/22* (2006.01)
  *H04W 52/02* (2009.01)
  *G02B 27/01* (2006.01)

(52) U.S. Cl.
  CPC ............. *H01Q 1/2258* (2013.01); *H04N 5/64* (2013.01); *H04W 52/028* (2013.01); *H04W 52/0245* (2013.01); *H04W 52/0254* (2013.01); *H04W 52/0274* (2013.01); *Y02D 30/70* (2020.08)

(58) Field of Classification Search
  CPC ......... H04W 52/0245; H04W 52/0254; H04W 52/0274; H04W 52/028; H04B 7/02; H04N 5/64
  USPC ......................................................... 342/374
  See application file for complete search history.

(56) References Cited

U.S. PATENT DOCUMENTS

| | | | |
|---|---|---|---|
| 9,092,898 B1* | 7/2015 | Fraccaroli | G06T 19/006 |
| 9,100,100 B2* | 8/2015 | Shi | H04B 7/0825 |
| 9,203,453 B2* | 12/2015 | Farrell | H04B 1/1607 |
| 9,496,937 B1* | 11/2016 | Wang | H04B 7/0608 |
| 9,757,016 B2* | 9/2017 | Hirabayashi | A61B 1/00006 |
| 9,807,777 B2* | 10/2017 | Kim | H04W 72/085 |
| 10,146,302 B2* | 12/2018 | Tokubo | H04B 7/04 |
| 10,324,474 B2* | 6/2019 | Hill | G08G 1/165 |
| 10,429,644 B2* | 10/2019 | Williamson | G01S 5/10 |
| 10,514,754 B2* | 12/2019 | Tokubo | A63F 13/211 |
| 10,578,878 B2* | 3/2020 | Pu | H01Q 3/245 |
| 2013/0336629 A1 | 12/2013 | Mulholland | |
| 2014/0078043 A1 | 3/2014 | Kim | |
| 2014/0364208 A1* | 12/2014 | Perry | A63F 13/54 463/31 |
| 2014/0378762 A1* | 12/2014 | Hirabayashi | A61B 1/045 600/109 |
| 2015/0282196 A1* | 10/2015 | Kim | H04L 5/0055 370/252 |
| 2018/0093177 A1* | 4/2018 | Tokubo | G06F 3/012 |
| 2018/0197502 A1* | 7/2018 | Kanishima | G02B 27/0172 |
| 2018/0287679 A1* | 10/2018 | Onishi | A63F 13/5255 |
| 2018/0357980 A1* | 12/2018 | Miyazaki | G02B 27/02 |
| 2019/0358537 A1* | 11/2019 | Chigusa | A63F 13/323 |
| 2019/0364564 A1* | 11/2019 | Onishi | G06K 9/00624 |

FOREIGN PATENT DOCUMENTS

| | | |
|---|---|---|
| JP | 2002112287 A | 4/2002 |
| JP | 2003347981 A | 12/2003 |
| JP | 2005223802 A | 8/2005 |
| JP | 2010114604 A | 5/2010 |
| KR | 1020150082842 A | 7/2015 |

OTHER PUBLICATIONS

International Preliminary Report on Patentability and Written Opinion for corresponding PCT Application No. PCT/JP2016/083758, 6 pages, dated May 31, 2018.
Extended European Search Report for corresponding EP Application No. 16866292.2, 9 pages, dated Jun. 14, 2019.
The First Office Action for corresponding CN Application No. 201680066224.X, 21 pages, dated Aug. 28, 2020.

* cited by examiner

FIG. 4

| DRIVE MANAGEMENT ID | ATTITUDE ANGLE RANGE DATA | | FIRST ANTENNA DRIVE FLAG | SECOND ANTENNA DRIVE FLAG | THIRD ANTENNA DRIVE FLAG | FOURTH ANTENNA DRIVE FLAG |
|---|---|---|---|---|---|---|
| 001 | $0 \leq \phi < 45$ | $-90 \leq \theta \leq 90$ | 1 | 0 | 0 | 0 |
| 002 | $45 \leq \phi < 135$ | $-90 \leq \theta \leq 90$ | 0 | 1 | 0 | 0 |
| 003 | $135 \leq \phi < 225$ | $-90 \leq \theta \leq 90$ | 0 | 0 | 1 | 0 |
| 004 | $225 \leq \phi < 315$ | $-90 \leq \theta \leq 90$ | 0 | 0 | 0 | 1 |
| 005 | $315 \leq \phi < 360$ | $-90 \leq \theta \leq 90$ | 1 | 0 | 0 | 0 |

FIG. 8

| DRIVE MANAGEMENT ID | ATTITUDE ANGLE RANGE DATA | | FIRST ANTENNA DRIVE FLAG | SECOND ANTENNA DRIVE FLAG | THIRD ANTENNA DRIVE FLAG | FOURTH ANTENNA DRIVE FLAG |
|---|---|---|---|---|---|---|
| 001 | $0 \leq \phi < 30$ | $-90 \leq \theta \leq 90$ | 1 | 0 | 0 | 0 |
| 002 | $30 \leq \phi < 120$ | $-90 \leq \theta \leq 90$ | 0 | 1 | 0 | 0 |
| 003 | $120 \leq \phi < 240$ | $-90 \leq \theta \leq 90$ | 0 | 0 | 1 | 0 |
| 004 | $240 \leq \phi < 330$ | $-90 \leq \theta \leq 90$ | 0 | 0 | 0 | 1 |
| 005 | $330 \leq \phi < 360$ | $-90 \leq \theta \leq 90$ | 1 | 0 | 0 | 0 |

FIG. 9

| DRIVE MANAGEMENT ID | ATTITUDE ANGLE RANGE DATA | | FIRST ANTENNA DRIVE FLAG | SECOND ANTENNA DRIVE FLAG | THIRD ANTENNA DRIVE FLAG | FOURTH ANTENNA DRIVE FLAG |
|---|---|---|---|---|---|---|
| 001 | $0 \leq \phi < 22.5$ | $-90 \leq \theta \leq 90$ | 1 | 0 | 0 | 0 |
| 002 | $22.5 \leq \phi < 67.5$ | $-90 \leq \theta \leq 90$ | 1 | 1 | 0 | 0 |
| 003 | $67.5 \leq \phi < 112.5$ | $-90 \leq \theta \leq 90$ | 0 | 1 | 0 | 0 |
| 004 | $112.5 \leq \phi < 157.5$ | $-90 \leq \theta \leq 90$ | 0 | 1 | 1 | 0 |
| 005 | $157.5 \leq \phi < 202.5$ | $-90 \leq \theta \leq 90$ | 0 | 0 | 1 | 0 |
| 006 | $202.5 \leq \phi < 247.5$ | $-90 \leq \theta \leq 90$ | 0 | 0 | 1 | 1 |
| 007 | $247.5 \leq \phi < 292.5$ | $-90 \leq \theta \leq 90$ | 1 | 0 | 0 | 1 |
| 008 | $292.5 \leq \phi < 337.5$ | $-90 \leq \theta \leq 90$ | 1 | 0 | 0 | 1 |
| 009 | $337.5 \leq \phi < 360$ | $-90 \leq \theta \leq 90$ | 1 | 0 | 0 | 0 |

FIG. 11

| DRIVE MANAGEMENT ID | ATTITUDE ANGLE RANGE DATA | | FIRST ANTENNA DRIVE FLAG | SECOND ANTENNA DRIVE FLAG | THIRD ANTENNA DRIVE FLAG | FOURTH ANTENNA DRIVE FLAG | FIFTH ANTENNA DRIVE FLAG |
|---|---|---|---|---|---|---|---|
| 001 | $0 \leq \phi < 45$ | $-90 \leq \theta < 45$ | 1 | 0 | 0 | 0 | 0 |
| 002 | $45 \leq \phi < 135$ | $-90 \leq \theta < 45$ | 0 | 1 | 0 | 0 | 0 |
| 003 | $135 \leq \phi < 225$ | $-90 \leq \theta < 45$ | 0 | 0 | 1 | 0 | 0 |
| 004 | $225 \leq \phi < 315$ | $-90 \leq \theta < 45$ | 0 | 0 | 0 | 1 | 0 |
| 005 | $315 \leq \phi < 360$ | $-90 \leq \theta < 45$ | 1 | 0 | 0 | 0 | 0 |
| 006 | $0 \leq \phi < 360$ | $45 \leq \theta \leq 90$ | 0 | 0 | 0 | 0 | 1 |

FIG. 12

| DRIVE MANAGEMENT ID | ATTITUDE ANGLE RANGE DATA | | FIRST ANTENNA DRIVE FLAG | SECOND ANTENNA DRIVE FLAG | THIRD ANTENNA DRIVE FLAG | FOURTH ANTENNA DRIVE FLAG | FIFTH ANTENNA DRIVE FLAG |
|---|---|---|---|---|---|---|---|
| 001 | $0 \leq \phi < 45$ | $-90 \leq \theta < 30$ | 1 | 0 | 0 | 0 | 0 |
| 002 | $45 \leq \phi < 135$ | $-90 \leq \theta < 30$ | 0 | 1 | 0 | 0 | 0 |
| 003 | $135 \leq \phi < 225$ | $-90 \leq \theta < 30$ | 0 | 0 | 1 | 0 | 0 |
| 004 | $225 \leq \phi < 315$ | $-90 \leq \theta < 30$ | 0 | 0 | 0 | 1 | 0 |
| 005 | $315 \leq \phi < 360$ | $-90 \leq \theta < 30$ | 1 | 0 | 0 | 0 | 0 |
| 006 | $0 \leq \phi < 45$ | $30 \leq \theta < 60$ | 1 | 1 | 0 | 0 | 0 |
| 007 | $45 \leq \phi < 135$ | $30 \leq \theta < 60$ | 0 | 1 | 1 | 0 | 1 |
| 008 | $135 \leq \phi < 225$ | $30 \leq \theta < 60$ | 0 | 0 | 1 | 1 | 1 |
| 009 | $225 \leq \phi < 315$ | $30 \leq \theta < 60$ | 1 | 0 | 0 | 1 | 1 |
| 010 | $315 \leq \phi < 360$ | $30 \leq \theta < 60$ | 0 | 0 | 0 | 0 | 1 |
| 011 | $0 \leq \phi < 360$ | $60 \leq \theta \leq 90$ | 0 | 0 | 0 | 0 | 1 |

ANTENNA CONTROL DEVICE, HEAD-MOUNTED DISPLAY, ANTENNA CONTROL METHOD, AND PROGRAM

TECHNICAL FIELD

The present invention relates to an antenna control apparatus, a head-mounted display, an antenna control method, and a program.

BACKGROUND ART

A head-mounted display (HMD) including a communication function exists.

SUMMARY

Technical Problems

Recently, for example, it is studied that a moving image representing a play status of a game and that is generated by a game apparatus executing a game program is transmitted wirelessly to an HMD and the moving image is displayed on the HMD. This process permits a user wearing the HMD to move the head freely and play a game.

In a situation in which the user moves the head freely and plays the game, when the HMD includes only one antenna, communication quality is low depending on a direction of the head of the user. In order to solve problems, the inventors investigate that the HMD includes a plurality of antennas. When the HMD includes an antenna in plurality, even if the communication quality of one antenna is low in accordance with a change in the direction of the head of the user, the communication quality of another antenna is expected to be high.

Herein, when received signals are specified on the basis of radio waves received by an antenna, radio waves received by an antenna having low communication quality are of small use. Therefore, from the standpoint of suppression of power consumption, an antenna having a high possibility that the communication quality is low is preferably controlled not to be driven.

In view of the foregoing, it is an object of the present invention to provide an antenna control apparatus, a head-mounted display, an antenna control method, and a program that are capable of suppressing power consumption of the head-mounted display including a plurality of antennas.

Solution to Problems

In order to solve the above-mentioned problems, an antenna control apparatus according to the present invention includes a selection unit configured to select, as an antenna to be driven, a portion of a plurality of antennas in accordance with an attitude of a head-mounted display including the plurality of antennas, and an antenna control unit configured to control only the antenna to be driven to be driven and an antenna other than the antenna to be driven to be stopped.

In a mode of the present invention, the head-mounted display further includes a switch that controls whether or not power is fed to the antenna, and the antenna control unit controls the switch so that power is fed to only the antenna to be driven and power is not fed to an antenna other than the antenna to be driven.

Further, in a mode of the present invention, the selection unit selects the antenna to be driven in plurality, and the plurality of selected antennas to be driven perform diversity reception.

Further, in a mode of the present invention, a size in a range of the attitude of the head-mounted display in which the antenna is controlled to be driven differs depending on the antenna.

Further, in a mode of the present invention, when a position or angle of the head-mounted display is changed by a predetermined amount or more, the antenna control unit controls all antennas included in the head-mounted display to be driven, and from among all the driven antennas, the selection unit selects the antenna to be driven in accordance with communication quality of communication with a communication partner.

Alternatively, when the communication quality between the head-mounted display and the communication partner is lower than predetermined quality, the antenna control unit controls all the antennas included in the head-mounted display to be driven, and from among all the driven antennas, the selection unit selects the antenna to be driven in accordance with the communication quality of the communication with the communication partner.

Further, a head-mounted display according to the present invention, including a plurality of antennas, includes a selection unit configured to select, as an antenna to be driven, a portion of the plurality of antennas in accordance with an attitude of the head-mounted display, and an antenna control unit configured to control only the antenna to be driven to be driven and an antenna other than the antenna to be driven to be stopped.

Further, an antenna control method according to the present invention includes a step of selecting, as an antenna to be driven, a portion of a plurality of antennas in accordance with an attitude of a head-mounted display including the plurality of antennas, and a step of controlling only the antenna to be driven to be driven and an antenna other than the antenna to be driven to be stopped.

Further, a program according to the present invention causes a computer to execute a procedure for selecting, as an antenna to be driven, a portion of a plurality of antennas in accordance with an attitude of a head-mounted display including the plurality of antennas, and a procedure for controlling only the antenna to be driven to be driven and an antenna other than the antenna to be driven to be stopped.

BRIEF DESCRIPTION OF DRAWINGS

FIG. 4 is a diagram illustrating an example of drive management data.

FIG. 8 is a diagram illustrating another example of the drive management data.

FIG. 9 is a diagram illustrating still another example of the drive management data.

FIG. 11 is a diagram illustrating still another example of the drive management data.

FIG. 12 is a diagram illustrating still another example of the drive management data.

DESCRIPTION OF EMBODIMENTS

Hereinafter, an embodiment of the present invention will be described with reference to the drawings.

Figure 1:
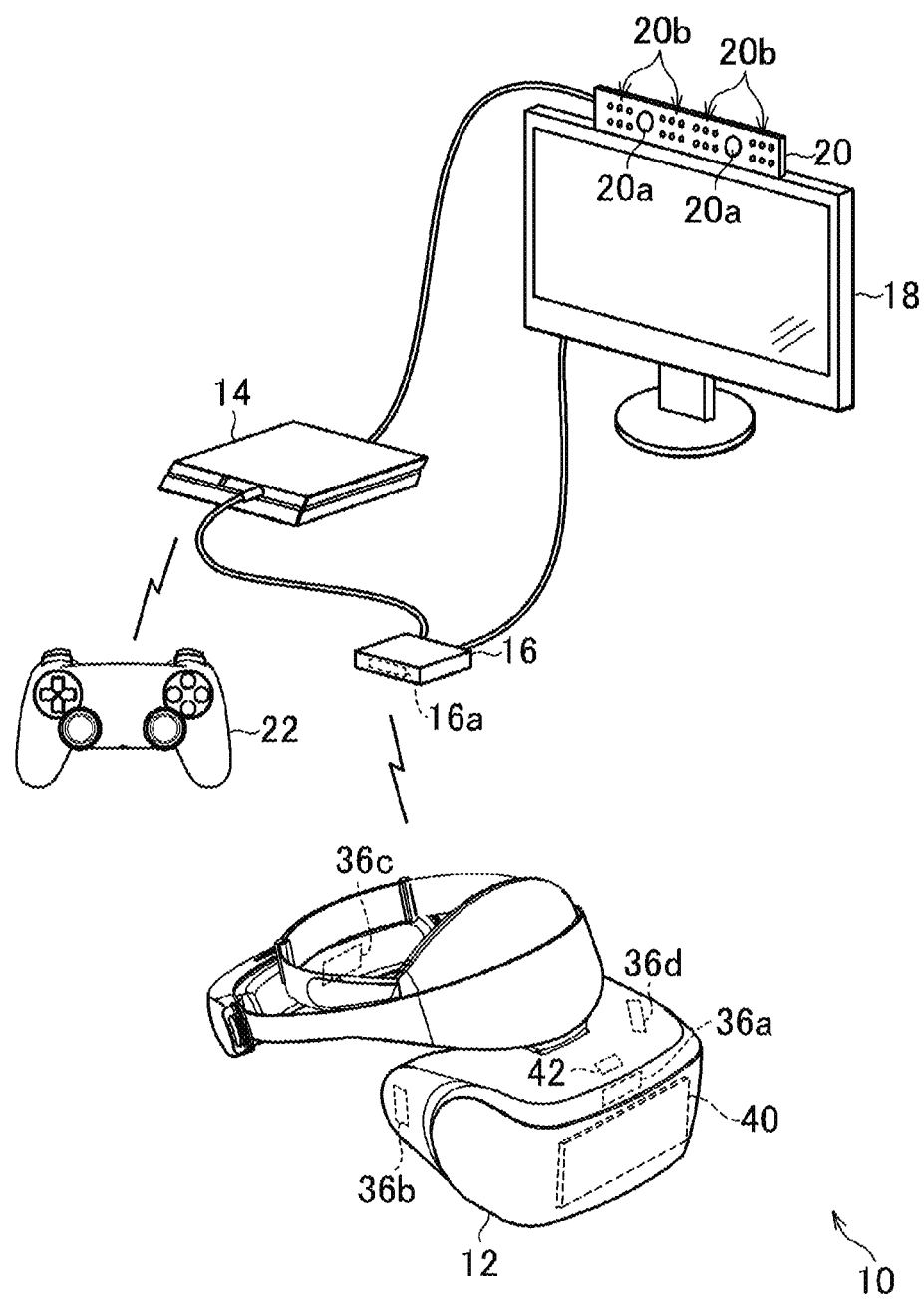
FIG. 1 is a diagram illustrating an example of the entire configuration of a video display system according to an embodiment of the present invention.
Figure 2:
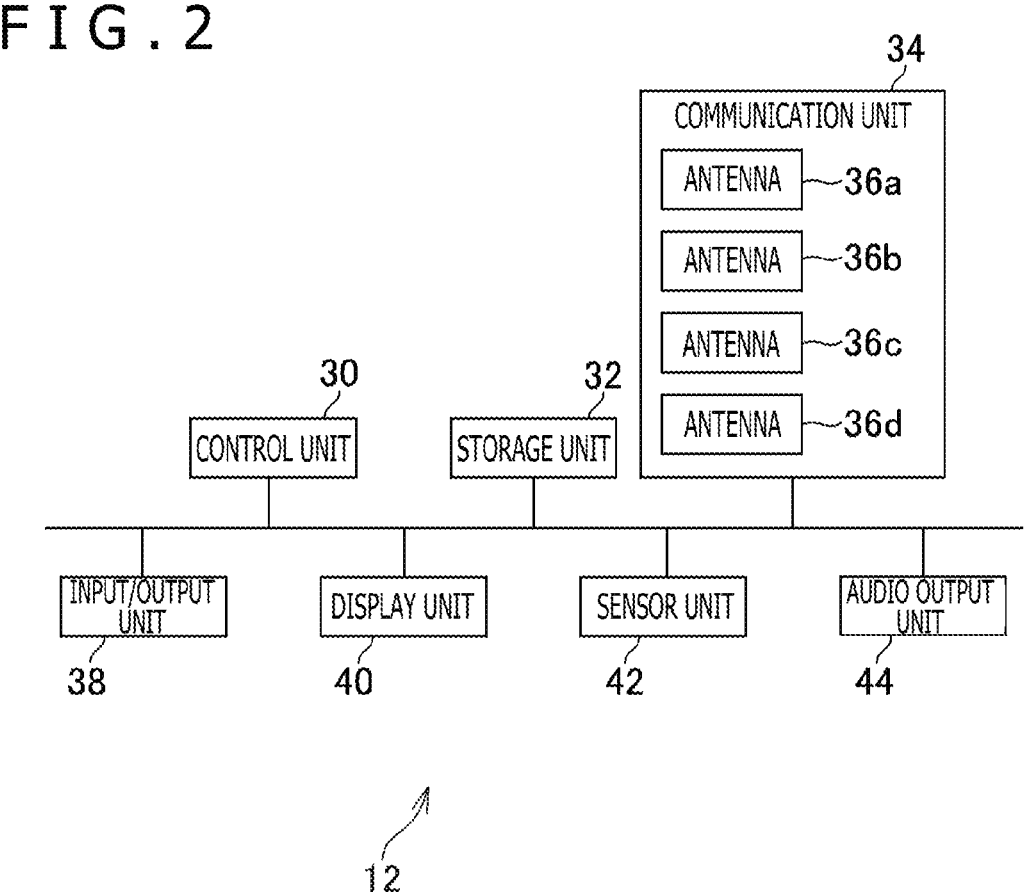
FIG. 2 is a diagram illustrating an example of a configuration of a head-mounted display according to the embodiment of the present invention.

FIG. 1 is a diagram illustrating an example of the entire configuration of a video display system 10 according to an embodiment of the present invention. FIG. 2 is a diagram illustrating an example of a configuration of a head-mounted display (HMD) 12 according to the present embodiment.

As illustrated in FIG. 1, the video display system 10 according to the present embodiment includes the HMD 12, an entertainment apparatus 14, a relay apparatus 16, a display 18, a camera-microphone unit 20, and a controller 22.

In the HMD 12 according to the present embodiment, as illustrated in FIG. 2, for example, a control unit 30, a storage unit 32, a communication unit 34, an input/output unit 38, a display unit 40, a sensor unit 42, and an audio output unit 44 are included.

The control unit 30 is a program control device such as a microprocessor operating in accordance with programs installed in the HMD 12.

The storage unit 32 is a storage device such as a read only memory (ROM) or random access memory (RAM). In the storage unit 32, programs or the like executed by the control unit 30 are stored.

The communication unit 34 is a communication interface such as a wireless local area network (LAN) module including a plurality of antennas 36. The communication unit 34 according to the present embodiment includes four antennas 36 (antennas 36a, 36b, 36c, and 36d). In the present embodiment, as illustrated in FIG. 1, the antenna 36a is disposed in the upper front side of the HMD 12. Further, the antenna 36b is disposed on the right side of the HMD 12. Further, the antenna 36c is disposed on the rear side of the HMD 12. Further, the antenna 36d is disposed on the left side of the HMD 12. In the present embodiment, these four antennas 36 are assumed to be an adaptive array antenna.

The input/output unit 38 is an input/output port such as a high-definition multimedia interface (HDMI) (registered trademark) port, a universal serial bus (USB) port, or an auxiliary (AUX) port.

The display unit 40 is a display disposed on the front side of the HMD 12, such as a liquid crystal display or an organic electroluminescence (EL) display, and displays videos generated by the entertainment apparatus 14 or the like. Further, the display unit 40 is housed in a chassis of the HMD 12. For example, the display unit 40 may receive video signals output by the entertainment apparatus 14 and relayed by the relay apparatus 16, and output videos expressed by the video signals. The display unit 40 according to the present embodiment displays, for example, a left-eye image and a right-eye image to thereby display a three-dimensional image. In addition, it may safely be said that the display unit 40 cannot display a three-dimensional image and can only display a two-dimensional image.

The sensor unit 42 is a sensor such as an acceleration sensor or a motion sensor. The sensor unit 42 outputs a measurement result of a rotation amount, a movement amount, or the like of the HMD 12 at a predetermined frame rate to the control unit 30.

The audio output unit 44 is, for example, headphones, a speaker, or the like and outputs audio or the like expressed by audio data generated by the entertainment apparatus 14. The audio output unit 44 receives audio signals output by the entertainment apparatus 14 and relayed by the relay apparatus 16, and outputs audio expressed by the audio signals.

The entertainment apparatus 14 according to the present embodiment is a computer such as a game console, a digital versatile disc (DVD) player, or a Blu-ray (registered trademark) player. The entertainment apparatus 14 according to the present embodiment, for example, executes a stored game program, reproduces contents recorded on an optical disk, or the like to thereby generate a video or audio. Then, the entertainment apparatus 14 according to the present embodiment outputs video signals expressing the generated videos or audio signals expressing the generated audio via the relay apparatus 16 to the HMD 12 or the display 18.

The relay apparatus 16 according to the present embodiment is a computer that relays the video signals or audio signals output from the entertainment apparatus 14 and that outputs the video signals or audio signals to the HMD 12 or display 18. In the relay apparatus 16 according to the present embodiment, there is included a communication unit 16a that is a communication interface such as a wireless LAN module in which an adaptive array antenna is housed.

The display 18 according to the present embodiment is, for example, a liquid crystal display or the like and displays videos, etc. expressed by the video signals output from the entertainment apparatus 14.

The camera-microphone unit 20 according to the present embodiment includes, for example, cameras 20a that output an image obtained by imaging a photographic object to the entertainment apparatus 14 and microphones 20b that acquire ambient audio, convert the audio into audio data, and output the audio data to the entertainment apparatus 14. Further, the cameras 20a according to the present embodiment are a stereo camera.

The HMD 12 and the relay apparatus 16 can, for example, transmit and receive data mutually by wireless communication. The entertainment apparatus 14 and the relay apparatus 16 are, for example, connected by an HDMI cable, a USB cable, or the like. The relay apparatus 16 and the display 18 are, for example, connected by an HDMI cable or the like. The entertainment apparatus 14 and the camera-microphone unit 20 are, for example, connected by an AUX cable or the like.

The controller 22 according to the present embodiment is an operation input apparatus for performing an operation input to the entertainment apparatus 14. A user depresses a direction key or button, or tilts an operation stick included in the controller 22 to thereby perform various types of operation inputs by using the controller 22. Then, in the present embodiment, the controller 22 outputs input data made to be correspondent to the operation input to the entertainment apparatus 14. Further, the controller 22 according to the present embodiment includes a USB port. Then, the controller 22 is connected to the entertainment apparatus 14 by a USB cable to thereby output input data to the entertainment apparatus 14 by wire. Further, the controller 22 according to the present embodiment includes a wireless communication module or the like and can also output the input data wirelessly to the entertainment apparatus 14.

In the present embodiment, wireless communication by millimeter waves such as 60 GHz band is performed between the HMD 12 and the relay apparatus 16. Since the millimeter waves are strong in a straight advancing property, communication quality is largely changed depending on a direction of the antenna 36. For example, when a communication pathway between the antenna 36 and the relay apparatus 16 is shielded by the head, etc. of the user wearing the HMD 12, communication quality of communication by the antenna 36 is reduced. Therefore, the communication quality of one antenna 36 may be high but that of another antenna 36 may be low. In the present embodiment, only the antenna 36 having high communication quality is controlled to be driven, and thereby power consumption of the HMD 12 can be suppressed.

Figure 3:
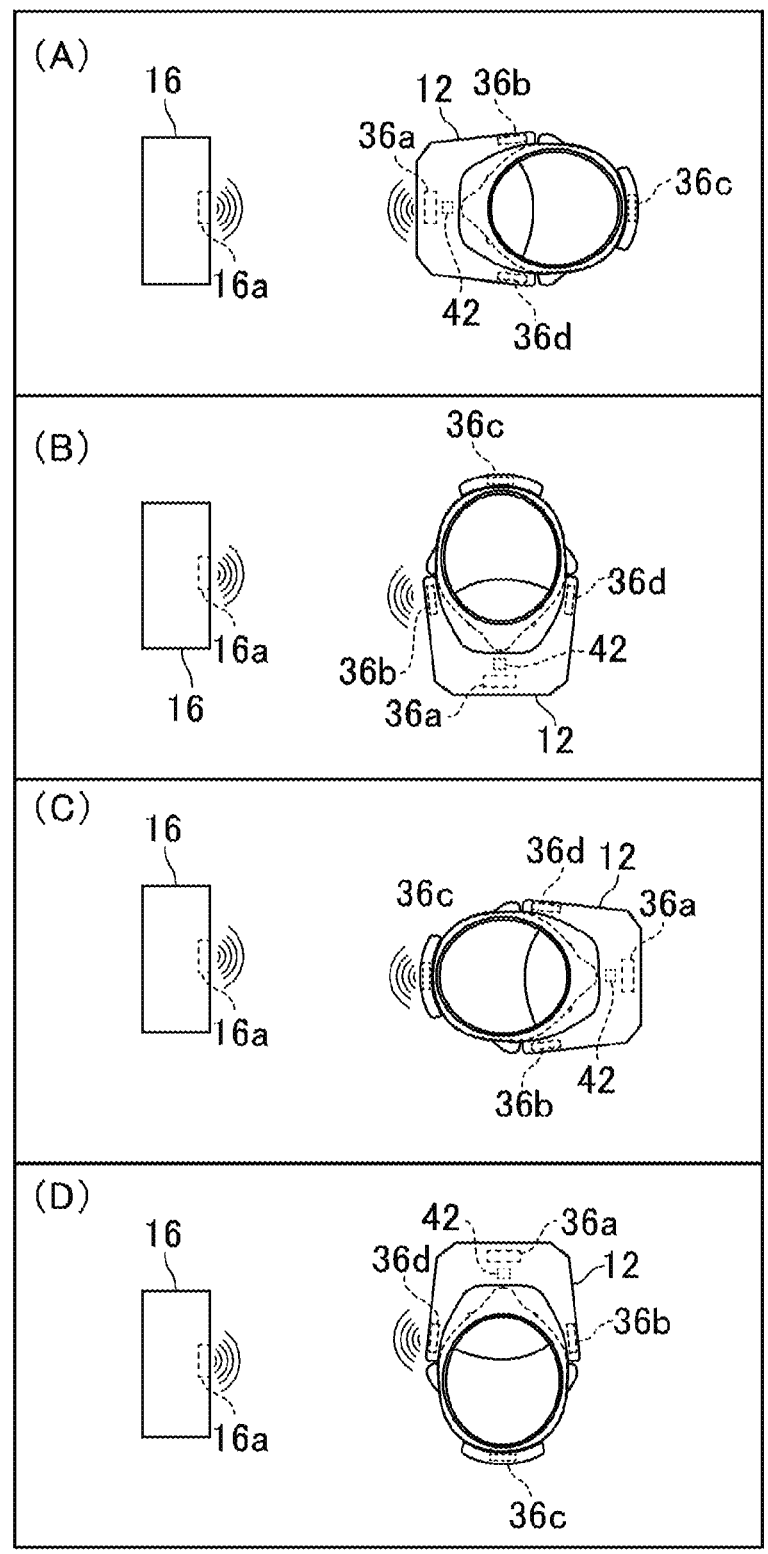
FIG. 3 is a schematic diagram illustrating an example of a relation between an attitude of the head-mounted display and a driven antenna.

FIG. 3 is a schematic diagram illustrating an example of a relation between an attitude of the HMD 12 and the driven antenna 36. As illustrated in FIG. 3(A), when the user wearing the HMD 12 faces toward the relay apparatus 16, only the antenna 36a is driven and the antenna 36b, the antenna 36c, and the antenna 36d are stopped. Further, as illustrated in FIG. 3(B), when the user wearing the HMD 12 faces to the left toward the relay apparatus 16, only the antenna 36b is driven and the antenna 36a, the antenna 36c, and the antenna 36d are stopped. Further, as illustrated in FIG. 3(C), when the user wearing the HMD 12 faces in a direction opposite to that of the relay apparatus 16, only the antenna 36c is driven and the antenna 36a, the antenna 36b, and the antenna 36d are stopped. Further, as illustrated in FIG. 3(D), when the user wearing the HMD 12 faces to the right toward the relay apparatus 16, only the antenna 36d is driven and the antenna 36a, the antenna 36b, and the antenna 36c are stopped. In this manner, in the present embodiment, the antenna 36 that is driven is changed in accordance with the attitude of the HMD 12.

In the present embodiment, which antenna 36 is driven in accordance with the attitude of the HMD 12 is managed by drive management data exemplified in FIG. 4. As illustrated in FIG. 4, in the drive management data, a drive management identifier (ID), attitude angle range data, and four antenna drive flags (first antenna drive flag, second antenna drive flag, third antenna drive flag, and fourth antenna drive flag) are included. The drive management ID is, for example, identification information of the drive management data. The attitude angle range data is a type of data indicating conditions relating to the attitude of the HMD 12 and is, for example, data indicating conditions of an angle range made to be correspondent to the attitude of the HMD 12 in the present embodiment. The first antenna drive flag is, for example, a flag indicating whether or not the antenna 36a is driven. The second antenna drive flag is, for example, a flag indicating whether or not the antenna 36b is driven. The third antenna drive flag is, for example, a flag indicating whether or not the antenna 36c is driven. The fourth antenna drive flag is, for example, a flag indicating whether or not the antenna 36d is driven.

In the present embodiment, the attitude angle range data is expressed by a combination of data indicating a range of an angle $\varphi$ and data indicating a range of an angle $\theta$. In the present embodiment, units of the angle $\varphi$ and the angle $\theta$ are assumed to be "degree."

Figure 5A:
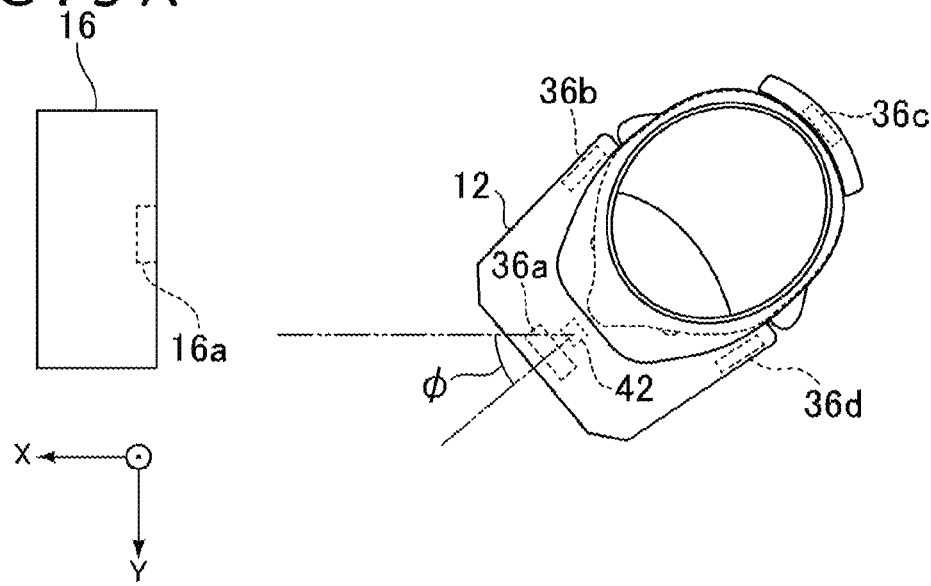
FIG. 5A is a diagram illustrating an example of an angle $\varphi$.
Figure 5B:
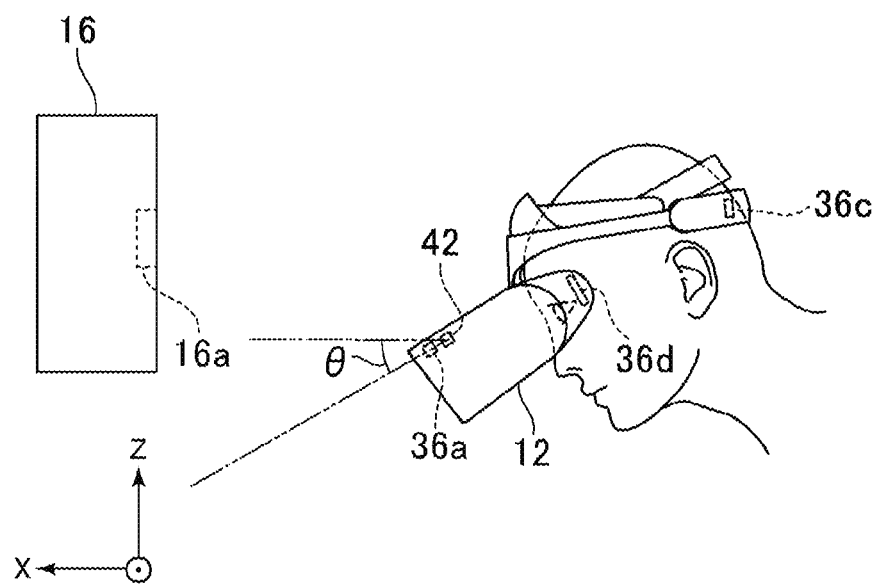
FIG. 5B is a diagram illustrating an example of an angle $\theta$.

FIG. 5A is a diagram illustrating an example of the angle $\varphi$. FIG. 5B is a diagram illustrating an example of the angle $\theta$. As illustrated in FIG. 5A and FIG. 5B, in the following descriptions, a horizontal direction to the relay apparatus 16 is assumed to be an X-axis positive direction when viewed from the user wearing the HMD 12. Further, a direction of rotating the X-axis positive direction counterclockwise by 90 degrees is assumed to be a Y-axis positive direction when viewed from a vertically upper direction. Further, the vertically upper direction is assumed to be a Z-axis positive direction. Further, in the present embodiment, in an initial condition, a direction to a sinciput from an occiput of the user wearing the HMD 12 is assumed to be the X-axis positive direction.

As illustrated in FIG. 5A, the angle $\varphi$ is an angle in which a counterclockwise rotation is plus to the X-axis positive direction in the direction to the sinciput from the occiput of the user wearing the HMD 12 when viewed from the Z-axis positive direction. Further, the angle $\varphi$ is assumed to take a value equal to or more than 0 and less than 360.

Further, as illustrated in FIG. 5B, the angle $\theta$ is an angle in which a counterclockwise rotation is plus to the X-axis positive direction in the direction to the sinciput from the occiput of the user wearing the HMD 12 when viewed from the Y-axis positive direction. Further, the angle $\theta$ is assumed to take a value equal to or more than $-90$ and equal to or less than $+90$.

In the present embodiment, on the basis of detection results, output by the sensor unit 42, according to the attitude of the HMD 12, for example, the angle $\varphi$ and the angle $\theta$ can be specified. Then, in the present embodiment, in accordance with values of the antenna drive flag associated with the attitude angle range data in which the specified angle $\varphi$ and angle $\theta$ satisfy conditions, whether the antennas 36 are driven or stopped is controlled. In the present embodiment, for example, when the value of the antenna drive flag is 1, the antenna 36 made to be correspondent to the antenna drive flag is controlled to be driven. Further, when the value of the antenna drive flag is 0, the antenna 36 made to be correspondent to the antenna drive flag is controlled to be stopped.

For example, when (30, 0) is specified as a value ($\varphi$, $\theta$), a value of the first antenna drive flag is 1 included in the drive management data in which a value of the drive management ID is 001, and therefore the antenna 36a made to be correspondent to a combination of the angle $\varphi$ and the angle $\theta$ is controlled to be driven. Further, values of the second antenna drive flag, the third antenna drive flag, and the fourth antenna drive flag are each 0, included in the drive management data in which the value of the drive management ID is 001, and therefore the antennas 36b, 36c, and 36d are controlled to be stopped.

As described above, in the present embodiment, there is driven only the antenna 36 having the high possibility that the communication quality with the relay apparatus 16 is high and that faces toward the relay apparatus 16, and the antennas 36 other than the above antenna 36 are stopped. Therefore, in accordance with the present embodiment, power consumption of the HMD 12 can be suppressed more than a case in which all of the plurality of antennas 36 are driven.

When whether or not radio waves received by the antenna 36 are used for the specification of received signals is controlled in accordance with the communication quality of the communication by the above antenna 36, it is necessary to continue monitoring the communication quality of the above antenna 36. Therefore, even if the communication quality is reduced, the above antenna 36 cannot be stopped.

Meanwhile, in the present embodiment, whether the antenna 36 is driven or stopped is controlled on the basis of the detection results of the sensor unit 42, and therefore it is not necessary to monitor the communication quality of the communication by the antenna 36 in order to control whether the antenna 36 is driven or stopped. Therefore, in the present embodiment, there is no problem even if a portion of the antennas 36 are stopped in accordance with the attitude of the HMD 12.

Hereinafter, functions of the HMD 12 according to the present embodiment and processes performed by the HMD 12 according to the present embodiment will be further described. In addition, the HMD 12 according to the present embodiment takes a role as an antenna control apparatus that controls driving and stopping of the antennas 36.

Figure 6:
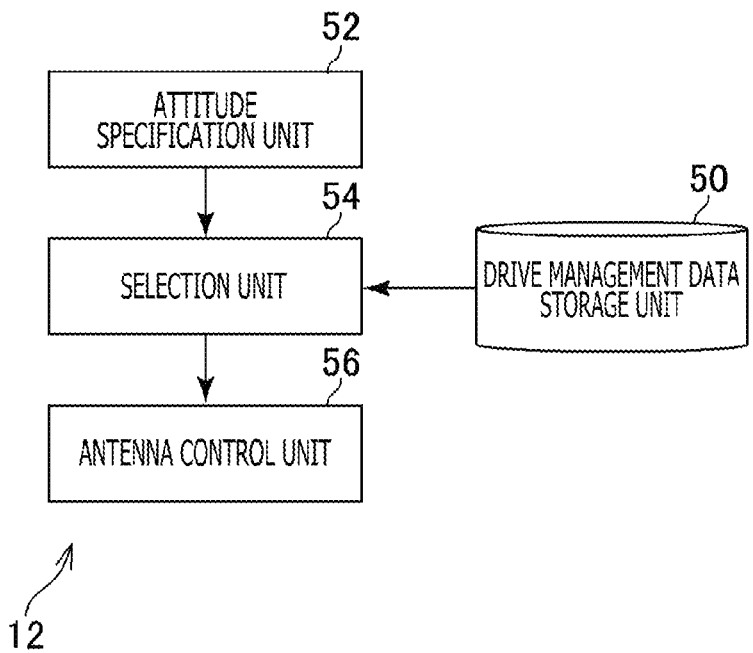
FIG. 6 is a functional block diagram illustrating an example of functions implemented by the head-mounted display according to the embodiment of the present invention.

FIG. 6 is a functional block diagram illustrating an example of functions implemented in the HMD 12 according to the present embodiment. In the HMD 12 according to the present embodiment, all the functions illustrated in FIG. 6 need not be implemented and functions other than the functions illustrated in FIG. 6 may be implemented.

Figure 7:
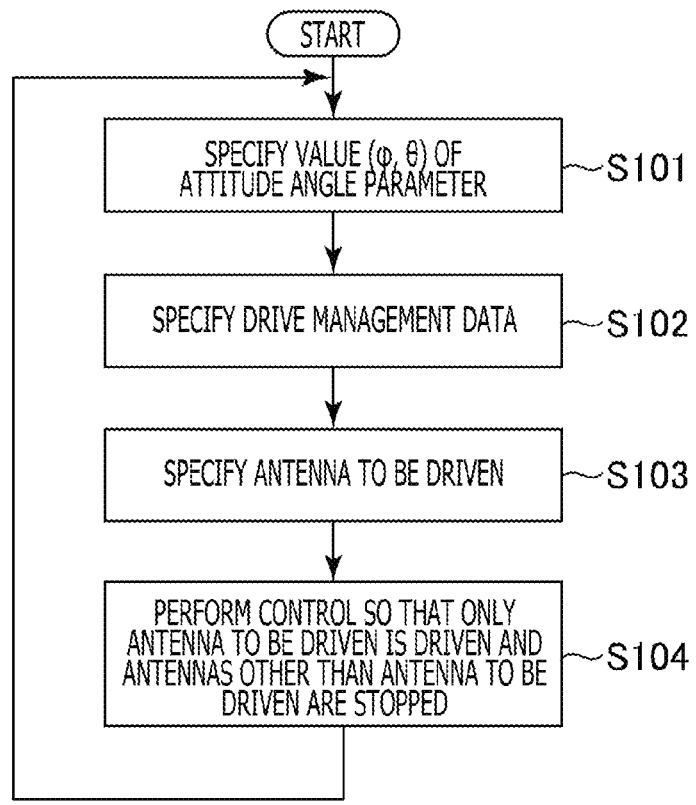
FIG. 7 is a flow diagram illustrating an example of a stream of processes performed in the head-mounted display according to the embodiment of the present invention.

As illustrated in FIG. 7, the HMD 12 according to the present embodiment functionally includes, for example, a drive management data storage unit 50, an attitude specification unit 52, a selection unit 54, and an antenna control unit 56. The drive management data storage unit 50 is mainly implemented as the storage unit 32. The attitude specification unit 52 is mainly implemented as the control unit 30 and the sensor unit 42. The selection unit 54 is mainly implemented as the control unit 30. The antenna control unit 56 is mainly implemented as the control unit 30 and the communication unit 34.

The above functions may be implemented by executing, using the control unit 30, a program including commands corresponding to the above functions and installed in the HMD 12 that is a computer. This program is supplied to the HMD 12 via a computer readable information storage medium such as an optical disk, a magnetic disk, a magnetic tape, a magnetic optical disk, or a flash memory, or via the Internet, etc.

In the present embodiment, for example, the drive management data storage unit 50 stores the drive management data exemplified in FIG. 4.

In the present embodiment, for example, the attitude specification unit 52 specifies the attitude of the HMD 12. On the basis of the detection results of the sensor unit 42, for example, the attitude specification unit 52 specifies the attitude of the HMD 12. Further, in the present embodiment, for example, the attitude specification unit 52 is assumed to retain attitude parameters indicating the attitudes of the HMD 12. In addition, for example, the attitude specification unit 52 may add a value indicating a difference of the attitude from the time of specifying a previous attitude until the time of specifying this attitude to a value of the attitude parameter retained by the attitude specification unit 52 and thereby update the value of the attitude parameter so as to be a value indicating an up-to-date attitude of the HMD 12.

The attitude parameter according to the present embodiment is assumed to be an attitude angle parameter ($\varphi$, $\theta$) that is a combination of the above-mentioned angle $\varphi$ and the above-mentioned angle $\theta$. Further, in the present embodiment, units of values of the attitude angle parameters are assumed to be "degree."

In the present embodiment, for example, the selection unit 54 selects, as the antenna to be driven, a portion of the plurality of antennas 36 included in the HMD 12 in accordance with the attitude of the HMD 12. In the present embodiment, for example, the selection unit 54 selects the antenna to be driven on the basis of a value of the attitude angle parameter ($\varphi$, $\theta$) specified by the attitude specification unit 52 and the drive management data stored by the drive management data storage unit 50. For example, the selection unit 54 specifies the drive management data including the attitude angle range data in which a value of the attitude angle parameter ($\varphi$, $\theta$) specified by the attitude specification unit 52 satisfies conditions in the angle range. Then, for example, the selection unit 54 selects, as the antenna to be driven, the antenna 36 made to be correspondent to the antenna drive flag in which the set value is 1 and that is included in the specified drive management data.

In the present embodiment, for example, the antenna control unit 56 controls only the antenna to be driven selected by the selection unit 54 to be driven and the antennas 36 other than the antenna to be driven to be stopped.

Hereinafter, an example of a stream of the processes performed in the HMD 12 according to the present embodiment will be described with reference to a flow diagram illustrated in FIG. 7.

First, the attitude specification unit 52 specifies a value ($\varphi$, $\theta$) of the attitude angle parameter indicating the attitude of the HMD 12 (S101).

Then, the selection unit 54 specifies the drive management data including the attitude angle range data in which the value ($\varphi$, $\theta$) of the attitude angle parameter specified in the process illustrated in S101 satisfies the conditions in the angle range (S102). For example, when (30, 0) is specified as the value ($\varphi$, $\theta$) of the attitude angle parameter in the process illustrated in S101, the drive management data in which a value of the drive management ID is 001 is specified in the process illustrated in S102.

Then, the selection unit 54 specifies, as the antenna to be driven, the antenna 36 made to be correspondent to the antenna drive flag in which the value is 1 and that is included in the drive management data specified in the process illustrated in S102 (S103). For example, when the drive management data in which a value of the drive management ID is 001 is specified in the process illustrated in S102, the antenna 36a made to be correspondent to the first antenna drive flag is specified as the antenna to be driven in the process illustrated in S103.

Then, the antenna control unit 56 controls only the antenna 36 specified as the antenna to be driven in the process illustrated in S103 to be driven and the antennas 36 other than the antenna to be driven to be stopped (S104). Herein, for example, when the stopped antenna 36 is specified as the antenna to be driven in the process illustrated in S103, driving power is supplied to the above antenna 36 and the above antenna 36 is driven. Further, when the driven antenna 36 is not specified as the antenna to be driven in the process illustrated in S103, a supply of the driving power to the above antenna 36 is stopped and the above antenna 36 is stopped.

Then, the process returns to the process illustrated in S101 and afterward execution of the processes illustrated in S101 to S104 is repeated.

In addition, the processes illustrated in S101 to S104 may be executed at a predetermined time interval. Further, for example, when the communication quality between the HMD 12 and the relay apparatus 16 is below predetermined quality, the processes illustrated in S101 to S104 may be executed.

The HMD 12 may further include a switch that controls whether or not power is fed to the antenna 36. Then, in the above-mentioned process illustrated in S104, the antenna control unit 56 may control the switch so that power is fed to only the antenna 36 that is the antenna to be driven and power is not fed to the antennas 36 other than the antenna to be driven. For example, when the antenna 36*a* is specified as the antenna to be driven, the antenna control unit 56 may control the switch so that power is fed to only the antenna 36*a* and power is not fed to the antenna 36*b*, the antenna 36*c*, and the antenna 36*d*.

Further, the drive management data stored in the drive management data storage unit 50 is not limited to that illustrated in FIG. 4. FIG. 8 is a diagram illustrating another example of the drive management data. In the example of FIG. 8, a range of the angle φ in which the antenna 36*a* is driven is 60 degrees, a range of the angle φ in which the antennas 36*b* and 36*d* are driven is 90 degrees, and a range of the angle φ in which the antenna 36*c* is driven is 120 degrees. In this manner, a size in the attitude range of the HMD 12 in which the above antenna 36 is controlled to be driven may differ depending on the antenna 36.

FIG. 9 is a diagram illustrating still another example of the drive management data. In a portion of the drive management data illustrated in FIG. 9, 1 is set as values of the antenna drive flags made to be correspondent to the plurality of antennas 36. In this case, the plurality of antennas 36 are driven. For example, when (30, 0) is specified as the value (φ, θ) of the attitude angle parameter, only the antenna 36*a* and the antenna 36*b* are controlled to be driven and the antenna 36*c* and the antenna 36*d* are controlled to be stopped. In this manner, the selection unit 54 may select the antenna to be driven in plurality. In this case, the plurality of selected antennas to be driven may perform diversity reception.

In addition, the present invention is not limited to the above-mentioned embodiment.

Figure 10:
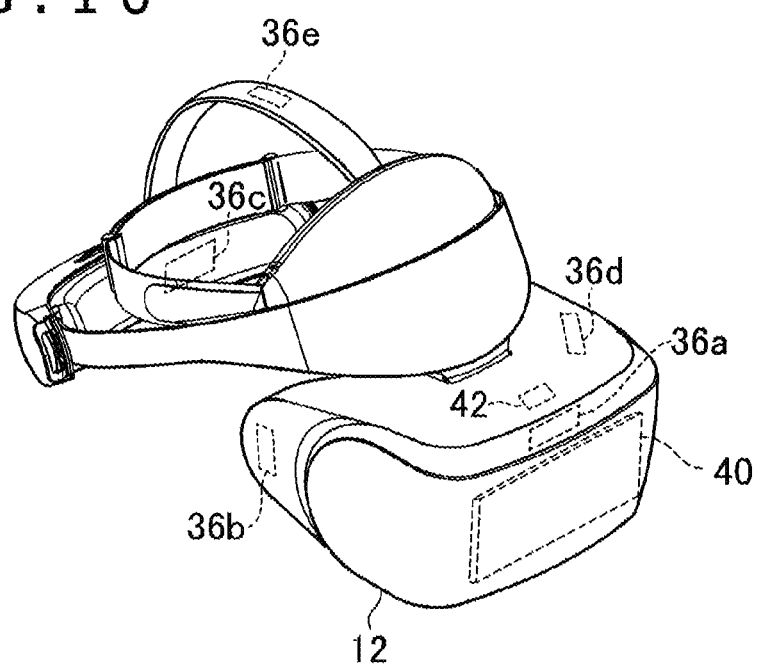
FIG. 10 is a diagram illustrating an example of a head-mounted display according to another embodiment of the present invention.

As illustrated in FIG. 10, for example, the communication unit 34 may include five antennas 36 (antennas 36*a*, 36*b*, 36*c*, 36*d*, and 36*e*). Further, the drive management data illustrated in FIG. 11 may be stored in the drive management data storage unit 50. In the drive management data illustrated in FIG. 11, five antenna drive flags (first antenna drive flag, second antenna drive flag, third antenna drive flag, fourth antenna drive flag, and fifth antenna drive flag) are included. In this manner, the fifth antenna drive flag that is a flag indicating whether or not the antenna 36*e* is driven may be included in the drive management data.

When the drive management data illustrated in FIG. 4, FIG. 8, or FIG. 9 is stored in the drive management data storage unit 50, a value of the angle θ does not make contribution to control of whether the antennas 36 are driven or stopped. Therefore, in this case, the attitude specification unit 52 does not have to specify the value of the angle θ in the above-mentioned process illustrated in S101.

Meanwhile, in the drive management data illustrated in FIG. 11, the value of the angle θ makes contribution to the control of whether the antennas 36 are driven or stopped. For example, when (30, 0) is specified as the value (φ, θ) of the attitude angle parameter, only the antenna 36*a* is controlled to be driven and the antenna 36*b*, the antenna 36*c*, the antenna 36*d*, and the antenna 36*e* are controlled to be stopped. On the one hand, when (30, 60) is specified as the value (φ, θ) of the attitude angle parameter, only the antenna 36*e* is controlled to be driven and the antenna 36*a*, the antenna 36*b*, the antenna 36*c*, and the antenna 36*d* are controlled to be stopped.

Further, the drive management data may be that illustrated in FIG. 12. In this case, when (30, 0) is specified as the value (φ, θ) of the attitude angle parameter, only the antenna 36*a* is controlled to be driven and the antenna 36*b*, the antenna 36*c*, the antenna 36*d*, and the antenna 36*e* are controlled to be stopped. Further, when (30, 45) is specified as the value (φ, θ) of the attitude angle parameter, only the antenna 36*a* and the antenna 36*e* are controlled to be driven and the antenna 36*b*, the antenna 36*c*, and the antenna 36*d* are controlled to be stopped. In this case, the antenna 36*a* and the antenna 36*e* may perform the diversity reception. Further, when (30, 75) is specified as the value (φ, θ) of the attitude angle parameter, only the antenna 36*e* is controlled to be driven and the antenna 36*a*, the antenna 36*b*, the antenna 36*c*, and the antenna 36*d* are controlled to be stopped.

Further, for example, when a position or angle of the HMD 12 is changed by the predetermined amount or more, the antenna control unit 56 may control all the antennas 36 included in the HMD 12 to be driven. For example, the attitude specification unit 52 may detect that a change amount of the position or angle of the HMD 12 from the previous selection of the antenna to be driven is the predetermined amount or more. Then, in accordance with the detection, the antenna control unit 56 may control all the antennas 36 included in the HMD 12 to be driven. Then, from among all the driven antennas, the selection unit 54 may select the antenna to be driven in accordance with the communication quality of the communication with the relay apparatus 16. For example, the selection unit 54 may select, as the antenna to be driven, the antenna 36 in which the communication quality of the communication with the relay apparatus 16 is highest. Then, the antenna control unit 56 may control only the selected antenna to be driven to be driven and the antennas 36 other than the antenna to be driven to be stopped.

When the position or angle of the HMD 12 is changed by the predetermined amount or more, the possibility is high that the communication quality of the communication by the driven antenna 36 is low and the communication quality of the communication by the stopped antenna 36 is high. Therefore, as described above, in accordance with the fact that the position or angle of the HMD 12 is changed by the predetermined amount or more, the driven antenna 36 can be changed so that only the antenna 36 having the high communication quality is driven.

Further, when the communication quality between the HMD 12 and the relay apparatus 16 is lower than the predetermined quality, the antenna control unit 56 may control all the antennas 36 included in the HMD 12 to be driven. Then, from among all the driven antennas, the selection unit 54 may select the antenna to be driven in accordance with the communication quality of the communication with the relay apparatus 16. Then, the antenna control unit 56 may control only the selected antenna to be driven to be driven and the antennas 36 other than the antenna to be driven to be stopped. In accordance with the fact that the communication quality between the HMD 12 and the relay apparatus 16 is lower than the predetermined quality, this process permits the driven antennas 36 to be changed so that only the antenna 36 having the high communication quality is driven.

Further, for example, a portion or the whole of the functions exemplified in FIG. 6 may be implemented using the entertainment apparatus 14. Further, for example, the above-mentioned attitude specification unit 52 may acquire an image photographed by the cameras 20a and specify the attitude of the HMD 12 on the basis of the image.

Further, the antennas 36 need not be an adaptive array antenna and further need not be a directional antenna.

Further, the above-mentioned specific character strings or values and specific character strings or values in the drawings are illustrative and not limited to these character strings or values.

The invention claimed is:

1. An antenna control apparatus comprising:
   a selection unit configured to select, as an antenna to be driven, a portion of a plurality of antennas in accordance with an attitude of a head-mounted display including the plurality of antennas; and
   an antenna control unit configured to control only the antenna to be driven to be driven and an antenna other than the antenna to be driven to be stopped,
   wherein a size in a range of the attitude of the head-mounted display in which the antenna is controlled to be driven differs depending on the antenna.

2. The antenna control apparatus according to claim 1, wherein
   the head-mounted display further includes a switch that controls whether or not power is fed to the antenna, and
   the antenna control unit controls the switch so that power is fed to only the antenna to be driven and power is not fed to an antenna other than the antenna to be driven.

3. The antenna control apparatus according to claim 1, wherein
   the selection unit selects the antenna to be driven in plurality, and
   the plurality of selected antennas to be driven perform diversity reception.

4. The antenna control apparatus according to claim 1, wherein
   when a position or angle of the head-mounted display is changed by a predetermined amount or more, the antenna control unit controls all antennas included in the head-mounted display to be driven, and
   from among all the driven antennas, the selection unit selects the antenna to be driven in accordance with communication quality of communication with a communication partner.

5. The antenna control apparatus according to claim 1, wherein
   when communication quality between the head-mounted display and a communication partner is lower than predetermined quality, the antenna control unit controls all antennas included in the head-mounted display to be driven, and
   from among all the driven antennas, the selection unit selects the antenna to be driven in accordance with the communication quality of communication with the communication partner.

6. A head-mounted display including a plurality of antennas, comprising:
   a selection unit configured to select, as an antenna to be driven, a portion of the plurality of antennas in accordance with an attitude of the head-mounted display; and
   an antenna control unit configured to control only the antenna to be driven to be driven and an antenna other than the antenna to be driven to be stopped,
   wherein a size in a range of the attitude of the head-mounted display in which the antenna is controlled to be driven differs depending on the antenna.

7. An antenna control method comprising:
   selecting, as an antenna to be driven, a portion of a plurality of antennas in accordance with an attitude of a head-mounted display including the plurality of antennas; and
   controlling only the antenna to be driven to be driven and an antenna other than the antenna to be driven to be stopped,
   wherein a size in a range of the attitude of the head-mounted display in which the antenna is controlled to be driven differs depending on the antenna.

* * * * *